(12) United States Patent
Kurata

(10) Patent No.: US 11,954,896 B2
(45) Date of Patent: Apr. 9, 2024

(54) DRIVING SUPPORT DEVICE

(71) Applicant: SUZUKI MOTOR CORPORATION, Hamamatsu (JP)

(72) Inventor: Koji Kurata, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 317 days.

(21) Appl. No.: 17/406,793

(22) Filed: Aug. 19, 2021

(65) Prior Publication Data
US 2022/0067409 A1 Mar. 3, 2022

(30) Foreign Application Priority Data
Aug. 25, 2020 (JP) .................................. 2020-141592

(51) Int. Cl.
*G06V 10/60* (2022.01)
*B60W 30/09* (2012.01)
(Continued)

(52) U.S. Cl.
CPC ............. *G06V 10/60* (2022.01); *B60W 30/09* (2013.01); *B60W 30/18163* (2013.01);
(Continued)

(58) Field of Classification Search
CPC .... G06V 10/60; G06V 20/584; G06V 20/588; B60W 60/0015; B60W 30/09;
(Continued)

(56) References Cited

U.S. PATENT DOCUMENTS

| 2007/0035416 | A1 | 2/2007 | Tanaka et al. ................ 340/906 |
| 2010/0007500 | A1 | 1/2010 | Mestres et al. ............ 340/572.4 |
| 2017/0217440 | A1 | 8/2017 | Kato et al. |
| 2018/0072314 | A1* | 3/2018 | Kurata .................. B60W 10/18 |

(Continued)

FOREIGN PATENT DOCUMENTS

| JP | 9-73529 A | 3/1997 |
| JP | 2005-115484 A | 4/2005 |

(Continued)

OTHER PUBLICATIONS

Indian Office Action dated Mar. 21, 2022, issued by the Indian Intellectual Property Office in corresponding application IN 202114037482.
Notice of Reasons for Refusal dated Jan. 30, 2024, issued by the Japanese Patent Office in corresponding application JP 2020-141592.

*Primary Examiner* — Syed Haider
(74) *Attorney, Agent, or Firm* — Stein IP, LLC

(57) ABSTRACT

A driving support device include an imaging device for capturing an image of at least a front of the vehicle, and a control device for, detecting that the vehicle is approaching a merging section where a first road on which the vehicle is traveling and a second road having a height difference with respect to the first road merge with each other, identifying an image of a road surface of the merging section from the image when it is detected that the vehicle is approaching the merging section, for detecting that the road surface is irradiated with light emitted from another vehicle traveling on the second road based on luminance in the image, and performing a processing of avoiding contact between the vehicle and the other vehicle when it is detected that the road surface is irradiated with the light emitted.

7 Claims, 6 Drawing Sheets

(51) Int. Cl.
*B60W 30/18* (2012.01)
*B60W 40/04* (2006.01)
*B60W 50/14* (2020.01)
*B60W 60/00* (2020.01)
*G06V 20/56* (2022.01)
*G06V 20/58* (2022.01)

(52) U.S. Cl.
CPC ............ *B60W 40/04* (2013.01); *B60W 50/14* (2013.01); *B60W 60/0015* (2020.02); *G06V 20/584* (2022.01); *G06V 20/588* (2022.01); *B60W 2050/143* (2013.01)

(58) Field of Classification Search
CPC ........... B60W 30/18163; B60W 40/04; B60W 50/14; B60W 2050/143
See application file for complete search history.

(56) References Cited

U.S. PATENT DOCUMENTS

| | | | |
|---|---|---|---|
| 2019/0092333 A1* | 3/2019 | Ishioka | B60W 30/095 |
| 2020/0231158 A1* | 7/2020 | Okuyama | B60W 30/18163 |
| 2021/0197824 A1* | 7/2021 | Kim | B60K 35/00 |
| 2021/0334554 A1* | 10/2021 | Kanetake | G06V 10/25 |
| 2021/0387615 A1* | 12/2021 | Aoki | B60W 30/0956 |
| 2022/0355793 A1* | 11/2022 | Kurokawa | B60W 30/095 |
| 2022/0366700 A1* | 11/2022 | Endo | G06T 7/55 |

FOREIGN PATENT DOCUMENTS

| | | |
|---|---|---|
| JP | 2007-045350 A | 2/2007 |
| JP | 2010-108371 A | 5/2010 |
| JP | 2017-138766 A | 8/2017 |
| JP | 2018-052326 A | 4/2018 |

\* cited by examiner

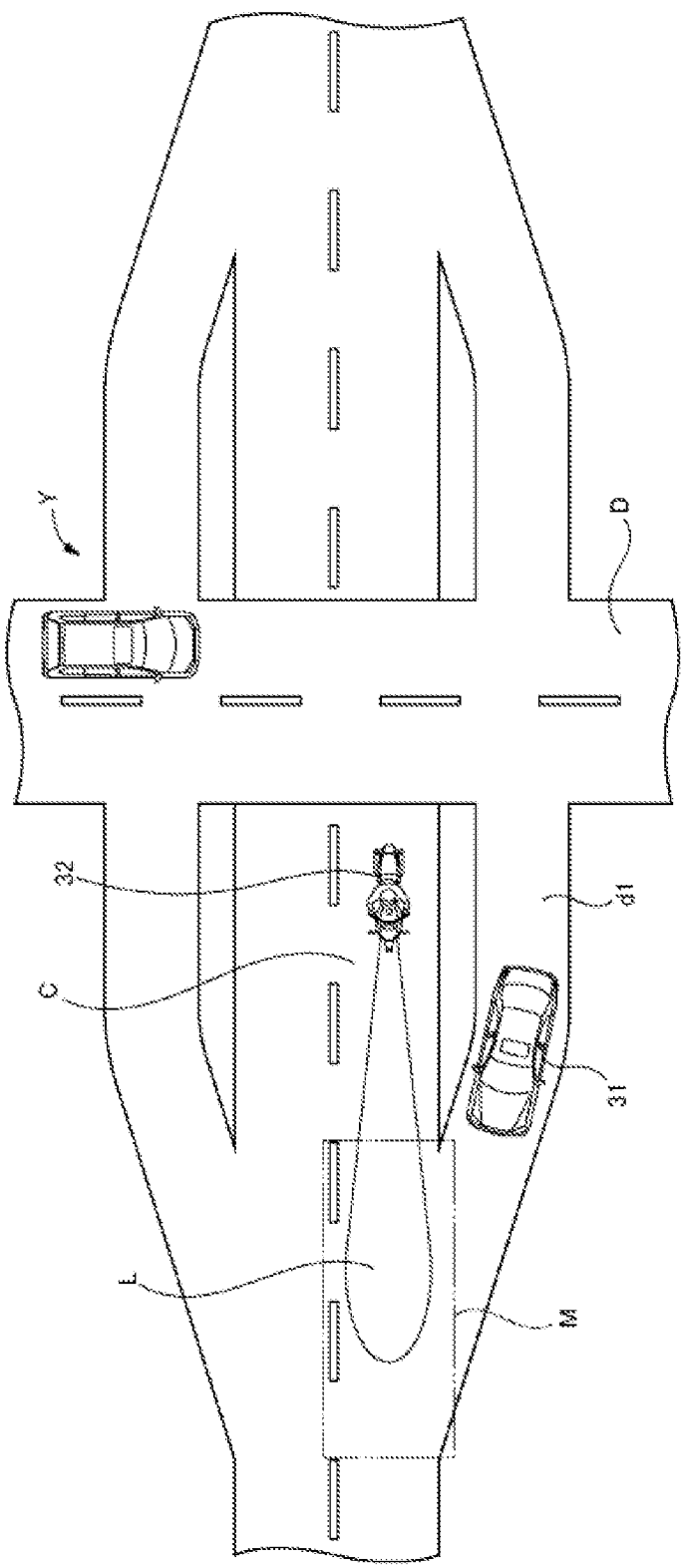
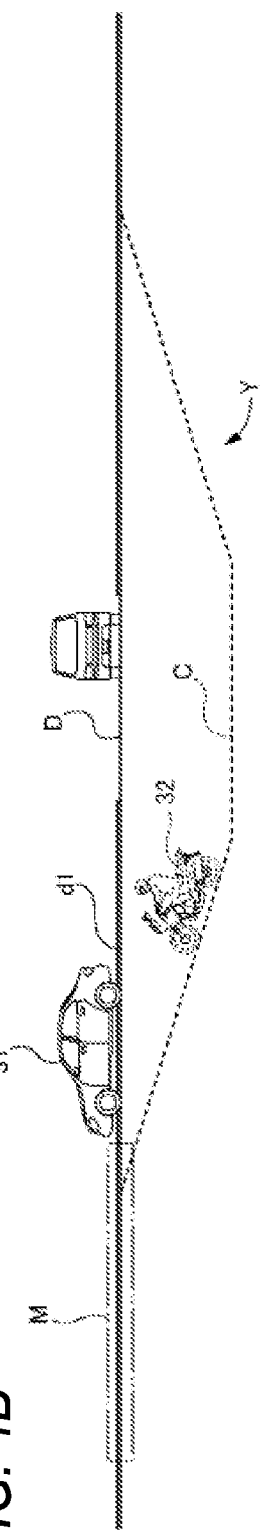
FIG. 4A
FIG. 4B

DRIVING SUPPORT DEVICE

CROSS-REFERENCE TO RELATED APPLICATIONS

The disclosure of Japanese Patent Application No. 2020-141592 filed on Aug. 25, 2020, including specification, drawings and claims is incorporated herein by reference in its entirety.

TECHNICAL FIELD

The present invention relates to a driving support device that supports driving of a vehicle.

BACKGROUND ART

A driving support device is known that detects an object around a vehicle using a camera, an ultrasonic sensor, a laser radar, a millimeter wave radar, or the like, and issues an alarm to a driver of the vehicle when the vehicle is approaching the object, so as to avoid contact between the vehicle and the object. For example, Patent Literature 1 below describes a two-wheeled vehicle monitoring device that recognizes a two-wheeled vehicle traveling behind an own vehicle by processing an image obtained from a CCD camera provided in the own vehicle, and issues an alarm to a driver of the own vehicle as necessary.

In a case where a driving support device is applied to a manual driving vehicle, the driving support device functions as a device that supports driving of the vehicle by a driver, and in a case where a driving support device is applied to an autonomous vehicle, the driving support device plays a role as a brain or a sensory device of the vehicle, recognizes a situation around the vehicle, and functions as a device that operates the vehicle according to the recognition.
Patent Literature 1: JP-A-H9-073529

SUMMARY OF INVENTION

An ultrasonic sensor, a laser radar, or a millimeter wave radar transmits an ultrasonic wave, a laser, or a millimeter wave, and receives a reflected wave generated by the ultrasonic wave, the laser, or the millimeter wave hitting an object and coming back, so as to detect the presence or absence of an object or a distance to the object. In many cases, the ultrasonic sensor, the laser radar, or the millimeter wave radar transmits an ultrasonic wave, a laser, or a millimeter wave having straight advancing ability from the vehicle in a horizontal direction. Therefore, it is difficult to detect an object present in a place having a height difference with respect to a place where the own vehicle is present by the ultrasonic sensor, the laser radar, or the millimeter wave radar provided in the own vehicle. For this reason, at the merging section where the two roads having a height difference from each other merge after the height difference therebetween disappears, the ultrasonic sensor, the laser radar, or the millimeter wave radar has a problem that it is difficult to improve the accuracy with which the own vehicle, which is traveling on one of these two roads toward a merging section, detects the approach of the other vehicle, which is traveling on the other road toward the merging section.

Specifically, in many cases, a connection path for a vehicle to move from a road A to a road B is provided at a grade separation where the road A and the road B three-dimensionally intersect with each other. For example, it is assumed that there is a grade separation (overpass) in which the road A climbs over the road B, and in the grade separation, there is a merging section where the connection path branching from the road B and the road A merge together after the road A climbs over the road B. In this case, the road A that climbs over the road B and extends toward the merging section is higher than the merging section when passing above the road B, and then gradually descends and becomes the same height as the merging section when reaching the merging section. Here, it is assumed that the own vehicle travels on the connection path and approaches the merging section. It is assumed that the other vehicle travels toward the merging section at a section of the road A that has passed above the road B and started to descend at this time point. In this case, the other vehicle is present at a position higher than that of the own vehicle. Therefore, the ultrasonic wave, the laser, or the millimeter wave transmitted in the horizontal direction from the ultrasonic sensor, the laser radar, or the millimeter wave radar provided in the own vehicle advances at a height lower than that of the other vehicle and does not hit the other vehicle, and as a result, the other vehicle may not be detected.

The same problem may occur in a grade separation (underpass) in which a road C passes under a road D. That is, it is assumed that there is a merging section where a connection path branching from the road D and the road C merge together after the road C passes under the road D in the grade separation. In this case, the road C that passes under the road D and extending toward the merging section is lower than the merging section when passing below the road D, and then gradually rises and becomes the same height as the merging section when reaching the merging section. Here, it is assumed that the own vehicle travels on the connection path and approaches the merging section. It is assumed that the other vehicle travels toward the merging section at a section of the road C that has passed under the road D and started to rise at this time point. In this case, since the other vehicle is present at a position lower than that of the own vehicle, the ultrasonic wave, the laser, or the millimeter wave transmitted in the horizontal direction from the ultrasonic sensor, the laser radar, or the millimeter wave radar provided in the own vehicle advances at a height higher than that of the other vehicle and does not hit the other vehicle, and as a result, the other vehicle may not be detected.

Certainly, at any grade separation, when the other vehicle is sufficiently close to the merging section, the heights of the own vehicle and the other vehicle are the same, so that the ultrasonic sensor, the laser radar or the millimeter wave radar provided in the own vehicle can detect the other vehicle. However, when the other vehicle can be detected, the other vehicle is present at a position very close to the own vehicle, and there is a possibility that the own vehicle needs to be suddenly braked in order to avoid contact between the two vehicles.

On the other hand, in the merging section where two roads having a height difference from each other merge after the height difference therebetween disappears, when the own vehicle traveling on one road toward the merging section detects the approach of the other vehicle traveling on the other road toward the merging section, it is conceivable to identify an image of the other vehicle from images captured by a camera provided in the own vehicle and detect the approach of the other vehicle based on the identified image. However, since walls, guardrails, fences, and the like for preventing falling are provided on both sides of the road A that passes above the road B in the overpass grade separation, these walls, guardrails, and fences may become obstacles, and the other vehicle traveling on the road A toward the merging section may not be reflected by the camera. Further, in the underpass grade separation, since the road C passing under the road D is submerged in the ground, the other vehicle traveling on the road C toward the merging section may not be reflected by the camera.

The present invention has been made in view of, for example, the above-described problems, at the merging section where the two roads having a height difference from each other merge after the height difference therebetween disappears and an object of the present invention is to provide a driving support device capable of improving the accuracy with which an own vehicle, which is traveling on one road toward a merging section, detects the approach of the other vehicle, which is traveling on the other road toward the merging section.

In order to solve the above-described problems, the present invention provides a driving support device that supports driving of a vehicle, the driving support device including: an imaging device configured to capture an image of at least a front of the vehicle; and a control device configured: to detect whether or not the vehicle is approaching a merging section where a first road on which the vehicle is traveling and a second road having a height difference with respect to the first road merge with each other after there is no height difference between the first road and the second road; to identify an image of a road surface of the merging section from the image captured by the imaging device when it is detected that the vehicle is approaching the merging section; to detect whether or not the road surface of the merging section is irradiated with light emitted from a lighting device of another vehicle traveling on the second road based on luminance of each part in the image of the road surface of the merging section identified; and to perform a processing of avoiding contact between the vehicle and the other vehicle when it is detected that the road surface of the merging section is irradiated with the light emitted from the lighting device of the other vehicle.

BRIEF DESCRIPTION OF DRAWINGS

FIGS. 4A and 4B are explanatory diagrams showing a scene in which an own vehicle traveling on a connection path detects approach of the other vehicle traveling on a lower road in an underpass.

DESCRIPTION OF EMBODIMENTS

Figure 1:
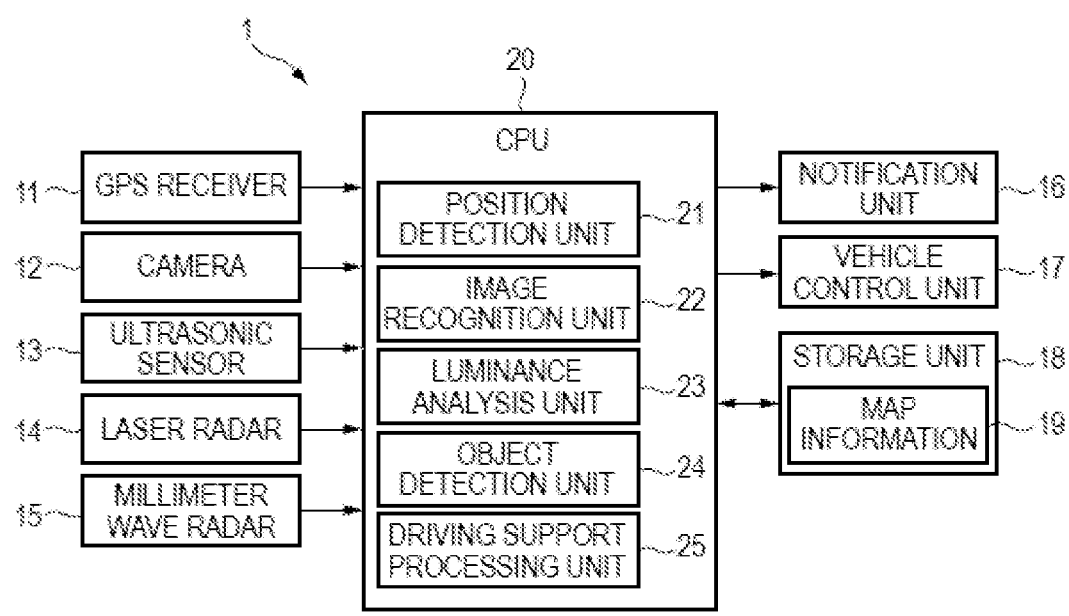
FIG. 1 is a block diagram showing a configuration of a driving support device according to an embodiment of the present invention.

A driving support device according to an embodiment of the present invention includes an imaging device, a first detection unit, a merging section image identification unit, a second detection unit, and a processing unit.

The imaging device captures an image of at least the front of an own vehicle. For example, the imaging device constantly images at least the front of the own vehicle while a power source of the own vehicle is operating.

The first detection unit detects whether or not the own vehicle is approaching a merging section where a first road on which the own vehicle is traveling and a second road having a height difference with respect to the first road merge with each other after there is no height difference between the first road and the second road. For example, the first detection unit determines whether or not the own vehicle is approaching the merging section based on a positioning signal and map information received from a global positioning system (GPS) satellite.

When the first detection unit detects that the own vehicle is approaching the merging section, the merging section image identification unit performs image recognition processing on an image captured by the imaging device, and identifies an image of a road surface of the merging section from the image.

The second detection unit performs a luminance analysis on the image of the road surface of the merging section identified by the merging section image identification unit, and detects whether or not the road surface of the merging section is irradiated with light emitted from a lighting device of another vehicle traveling on the second road based on the luminance of each part in the image of the road surface of the merging section.

When the second detection unit detects that the road surface of the merging section is irradiated with the light emitted from the lighting device of the other vehicle, the processing unit performs a processing of avoiding contact between the own vehicle and the other vehicle. As the processing of avoiding contact between the own vehicle and the other vehicle, the processing unit performs, for example, a processing of outputting an alarm to an occupant of the own vehicle, a processing of controlling the own vehicle to decelerate, a processing of controlling the own vehicle to stop, and the like.

The driving support device according to the embodiment of the present invention having such a configuration will be specifically described with reference to examples of the grade separation of the two forms described above.

First, an example of an overpass grade separation will be described. It is assumed that there is an overpass grade separation in which a road A climbs over a road B, and in the grade separation, there is a merging section where a connection path branching from the road B and the road A merge together after the road A climbs over the road B. Then, it is assumed that the own vehicle travels on the connection path and approaches the merging section. Further, it is assumed that the other vehicle travels toward the merging section at a section of the road A that has passed above the road B and started to descend at this time point.

In this state, the first detection unit of the driving support device provided in the own vehicle detects whether or not the own vehicle is approaching the merging section where the connection path on which the own vehicle is traveling and the road A having a height difference with respect to the connection path merge with each other after there is no height difference between the connection path and the road A. Subsequently, the merging section image identification unit of the driving support device identifies an image of a road surface of the merging section from images captured by the imaging device. Subsequently, the second detection unit of the driving support device detects whether or not the road surface of the merging section is irradiated with light emitted from a lighting device of the other vehicle traveling on the road A, based on the luminance of each part in the image of the road surface of the merging section identified by the merging section image identification unit. In this example, when the own vehicle is approaching the merging section, the other vehicle travels toward the merging section at the road A that extends linearly while inclining downward toward the merging section. At this time, when the other vehicle turns on the lighting device such as a headlight, light emitted from the lighting device of the other vehicle reaches the road surface of the merging section. Therefore, in this case, the second detection unit of the driving support device detects that the road surface of the merging section is irradiated with the light emitted from the lighting device of the other vehicle traveling on the road A. The processing unit of the driving support device performs a processing of avoiding contact between the own vehicle and the other vehicle according to a detection result by the second detection unit.

Second, an example of an underpass grade separation will be described. It is assumed that there is an underpass grade separation in which a road C passes under a road D, and in the grade separation, there is a merging section where a connection path branching from the road D and the road C merge together after the road C passes under the road D. Then, it is assumed that the own vehicle travels on the connection path and approaches the merging section. Further, it is assumed that the other vehicle travels toward the merging section at a section of the road C that has passed under the road D and started to rise at this time point.

In this state, the first detection unit of the driving support device provided in the own vehicle detects whether or not the own vehicle is approaching the merging section where the connection path on which the own vehicle is traveling and the road C having a height difference with respect to the connection path merge with each other after there is no height difference between the connection path and the road C. Subsequently, the merging section image identification unit of the driving support device identifies an image of a road surface of the merging section from images captured by the imaging device. Subsequently, the second detection unit of the driving support device detects whether or not the road surface of the merging section is irradiated with light emitted from a lighting device of the other vehicle traveling on the road C, based on the luminance of each part in the image of the road surface of the merging section identified by the merging section image identification unit. In this example, when the own vehicle is approaching the merging section, the other vehicle travels toward the merging section at the road C that extends linearly while inclining upward toward the merging section. At this time, when the other vehicle turns on the lighting device such as a headlight, light emitted from the lighting device of the other vehicle reaches the road surface of the merging section. Therefore, in this case, the second detection unit of the driving support device detects that the road surface of the merging section is irradiated with the light emitted from the lighting device of the other vehicle traveling on the road C. The processing unit of the driving support device performs a processing of avoiding contact between the own vehicle and the other vehicle according to a detection result by the second detection unit.

Here, in the above two examples, the second detection unit detects whether or not the road surface of the merging section is irradiated with the light emitted from the lighting device of the other vehicle traveling on the road A or road C, based on the luminance of each part in the image of the road surface of the merging section. When the light emitted from the lighting device reaches the road surface at night or even in the daytime, a luminance difference occurs between a portion irradiated with the light emitted from the lighting device and a portion not irradiated with the light emitted from the lighting device in the image of the road surface. Therefore, it is possible to accurately detect that the road surface is irradiated with the light emitted from the lighting device based on the luminance of each part of the image of the road surface. Therefore, according to the second detection unit, it is possible to accurately detect whether or not the road surface of the merging section is irradiated with the light emitted from the lighting device of the other vehicle traveling on the road A or road C based on the luminance of each part in the image of the road surface of the merging section.

As described above, the driving support device according to the present embodiment detects the other vehicle approaching the merging section while descending from a place higher than the merging section, or the other vehicle approaching the merging section while ascending from a place lower than the merging section, based on the light emitted from the lighting device of the other vehicle to the road surface of the merging section. In addition, the driving support device according to the present embodiment detects that the road surface of the merging section is irradiated with the light emitted from the lighting device of the other vehicle based on the luminance of each part in the image of the road surface of the merging section. As a result, when the other vehicle is traveling while turning on the lighting device such as a headlight at night or turning on the lighting device such as a headlight in the daytime, the other vehicle approaching the merging section while descending from a place higher than the merging section or the other vehicle approaching the merging section while ascending from a place lower than the merging section can be detected with higher accuracy than when the other vehicle is detected using the ultrasonic sensor, the laser radar, and the millimeter wave radar. Therefore, according to the driving support device according to the present embodiment, at the merging section where the two roads having a height difference from each other merge after the height difference therebetween disappears, it is possible to improve the accuracy with which an own vehicle, which is traveling on one road toward a merging section, detects the approach of the other vehicle, which is traveling on the other road toward the merging section.

Embodiment (Driving Support Device)

FIG. 1 shows a configuration of a driving support device 1 according to an embodiment of the present invention. In FIG. 1, the driving support device 1 is a device that is provided in an own vehicle and supports driving of the own vehicle. The own vehicle in the present embodiment is, for example, a four-wheeled motor vehicle in which a driver (person) mainly performs driving. The driving support device 1 includes a GPS receiver 11, a camera 12, an ultrasonic sensor 13, a laser radar 14, a millimeter wave radar 15, a notification unit 16, a vehicle control unit 17, a storage unit 18, and a central processing unit (CPU) 20.

The GPS receiver 11 is a device that receives a positioning signal indicating a current position of the own vehicle from a GPS satellite. The GPS receiver 11 outputs the received positioning signal to the CPU 20.

The camera 12 is a device that captures an image of the front of the own vehicle. The camera 12 may be a still camera or a video camera. The camera 12 continuously captures images of the front of the own vehicle while a power source (for example, an internal combustion engine or an electric motor) of the own vehicle is operating, and outputs the captured images to the CPU 20. The camera 12 is a specific example of the imaging device. The camera 12 is attached to, for example, a front end portion of a body of the own vehicle or in the vicinity of a windshield in a driving cab of the own vehicle. The camera 12 includes a wide-angle lens having an angle of view in the horizontal direction of, for example, about 180 degrees, and can capture an image of a wide range in front of the own vehicle. For example, four cameras may be attached to the front end portion, a rear end portion, a left portion, and a right portion of the own vehicle, respectively, so that the front, the rear, the left, and the right around the own vehicle can be widely imaged.

The ultrasonic sensor 13, the laser radar 14, and the millimeter wave radar 15 are devices that detect an object present around the own vehicle using ultrasonic waves, laser (light), and millimeter waves (radio waves), respectively. The ultrasonic sensor 13, the laser radar 14, and the millimeter wave radar 15 output a detection signal indicating a detection result to the CPU 20. Each of the ultrasonic sensor 13, the laser radar 14, and the millimeter wave radar 15 is a specific example of an object detector. The driving support device 1 includes, for example, six ultrasonic sensors 13, and the ultrasonic sensors 13 are attached to a front center, a front left corner, a front right corner, a rear center, a rear left corner, and a rear right corner of the body of the own vehicle, respectively. With these ultrasonic sensors 13, it is possible to detect an object that is present in front of, behind, on the left of, or to on right of the own vehicle and that is mainly present in a place close to the own vehicle. In addition, the driving support device 1 includes, for example, six millimeter wave radars 15, and these millimeter wave radars 15 are attached to the above-described six places of the body of the own vehicle, similarly to the ultrasonic sensors 13. With these millimeter wave radars 15, it is possible to detect an object that is present in front of, behind, on the left of, or on the right of the own vehicle and that is located at a certain distance from the own vehicle. The laser radar 14 is attached to, for example, a roof of the own vehicle. With the laser radar 14, it is possible to measure a distance between the own vehicle and an object in front of the own vehicle with high accuracy.

The notification unit 16 is a device that outputs an alarm or a message to the driver of the own vehicle. The notification unit 16 operates based on a control signal output from the CPU 20. The notification unit 16 includes a speaker that outputs an alarm sound or a message sound. In addition, an alarm lamp or a display for displaying a message may be added to the notification unit 16. The notification unit 16 is disposed, for example, in the driving cab of the own vehicle.

The vehicle control unit 17 is a device that controls a brake device, a power source, or the like of the own vehicle, and mainly performs control for decelerating the own vehicle (deceleration control) or control for stopping the own vehicle (stop control). The vehicle control unit 17 performs the above-described control based on a command signal or the like output from the CPU 20.

The storage unit 18 includes a storage device such as a semiconductor memory or a hard disk. The storage unit 18 stores map information 19. The CPU 20 can read the information stored in the storage unit 18 and write information into the storage unit 18.

The CPU 20 is a control device that controls the driving support device 1. In addition, the CPU 20 performs driving support processing, which will be described later. The CPU 20 and the storage unit 18 are disposed, for example, in the driving cab of the own vehicle. The CPU 20 functions as a position detection unit 21, an image recognition unit 22, a luminance analysis unit 23, an object detection unit 24, and a driving support processing unit 25 by reading and executing a computer program stored in the storage unit 18, for example.

The position detection unit 21 detects a position of the own vehicle based on the positioning signal received by the GPS receiver 11 and the map information 19 stored in the storage unit 18. The GPS receiver 11 and the position detection unit 21 are specific examples of the first detection unit.

The image recognition unit 22 performs image recognition processing on an image captured by the camera 12. The image recognition unit 22 is a specific example of the merging section image identification unit.

The luminance analysis unit 23 performs luminance analysis on the image captured by the camera 12. The luminance analysis unit 23 is a specific example of the second detection unit.

The object detection unit 24 recognizes an object present around the own vehicle based on an image captured by the camera 12 and a detection signal output from the ultrasonic sensor 13, the laser radar 14, or the millimeter wave radar 15. The object detection unit 24 is a specific example of a third detection unit.

The driving support processing unit 25 controls the notification unit 16 to output an alarm or a message from the notification unit 16. The driving support processing unit 25 outputs, to the vehicle control unit 17, a command signal for performing deceleration control on the own vehicle, a command signal for performing stop control on the own vehicle, or the like, and causes the vehicle control unit 17 to perform deceleration control or stop control on the own vehicle. The driving support processing unit 25 is a specific example of the processing unit.

(Driving Support Processing)

Figure 2:
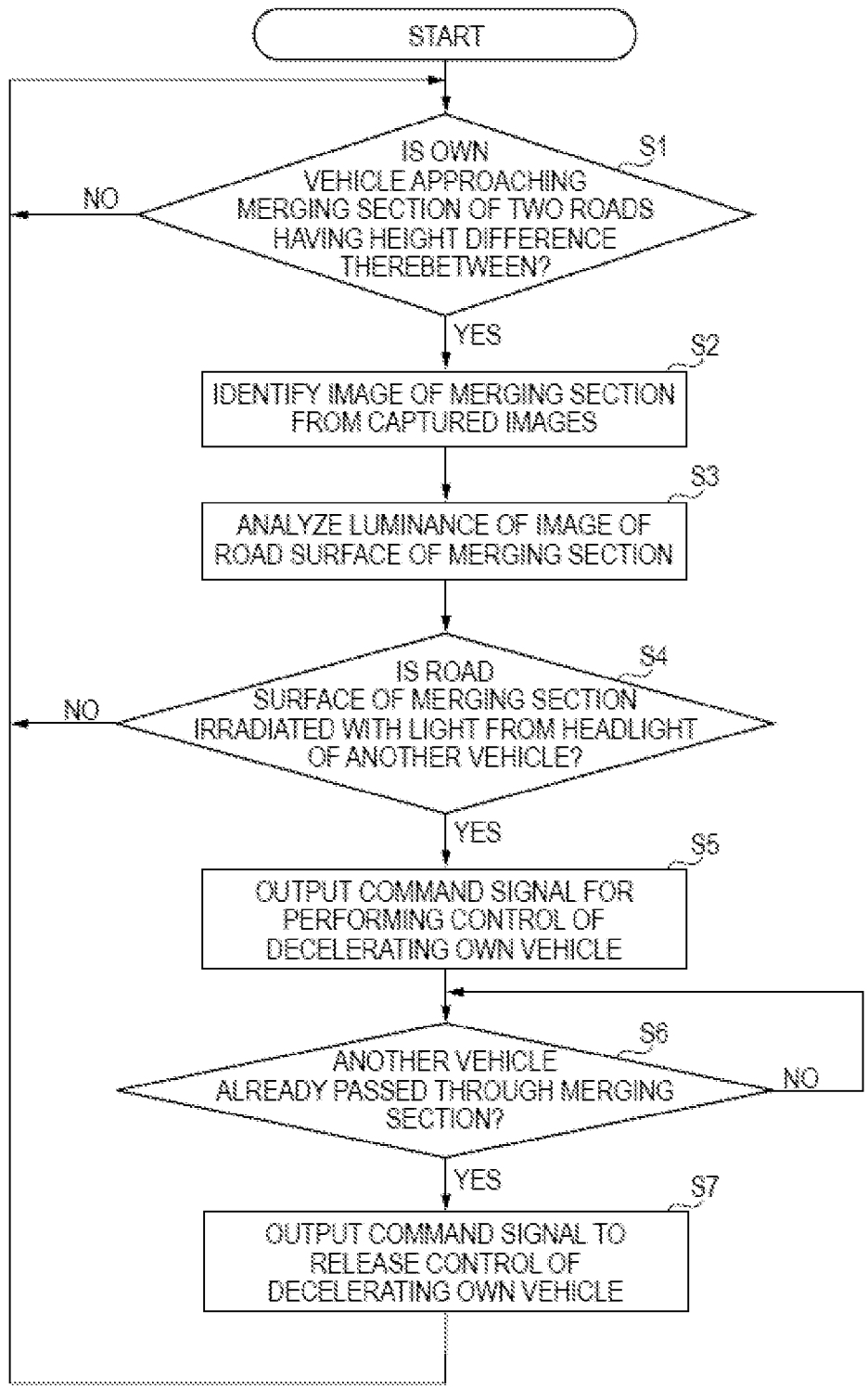
FIG. 2 is a flowchart showing a driving support processing in the driving support device according to the embodiment of the present invention.

FIG. 2 shows a driving support processing in the driving support device 1. When the driver of the own vehicle turns on the power of the own vehicle and starts the power source of the own vehicle, the driving support device 1 starts operation. That is, the camera 12 starts imaging, the GPS receiver 11 starts receiving a positioning signal, the ultrasonic sensor 13, the laser radar 14, and the millimeter wave radar 15 start detection, and the CPU 20 starts the driving support processing.

In the driving support processing shown in FIG. 2, first, the position detection unit 21 detects, based on the positioning signal received by the GPS receiver 11 and the map information 19 stored in the storage unit 18, whether or not the own vehicle is approaching a merging section where a first road on which the own vehicle is traveling and a second road having a height difference with respect to the first road merge with each other after there is no height difference between the first road and the second road (step S1).

When the position detection unit 21 detects that the own vehicle is approaching the merging section (step S1: YES), the image recognition unit 22 performs image recognition processing on an image captured by the camera 12, and identifies an image of a road surface of the merging section from the image (step S2).

Subsequently, the luminance analysis unit 23 performs luminance analysis on the image of the road surface of the merging section identified by the image recognition unit 22 (step S3). Then, the luminance analysis unit 23 detects whether or not the road surface of the merging section is irradiated with light emitted from a headlight of the other vehicle traveling on the second road, based on the luminance of each part in the image of the road surface of the merging section (step S4).

When the luminance analysis unit 23 detects that the road surface of the merging section is irradiated with the light emitted from the headlight of the other vehicle to (step S4: YES), the driving support processing unit 25 performs a processing of avoiding contact between the own vehicle and the other vehicle. Specifically, the driving support processing unit 25 outputs a command signal for decelerating the own vehicle to the vehicle control unit 17, and causes the vehicle control unit 17 to execute control for decelerating the own vehicle (step S5). As the processing of avoiding contact between the own vehicle and the other vehicle, a command signal for stopping the own vehicle may be output from the driving support processing unit 25 to the vehicle control unit 17, and the vehicle control unit 17 may be caused to execute control for stopping the own vehicle. In addition, as the processing of avoiding the contact between the own vehicle and the other vehicle, the driving support processing unit 25 may control the notification unit 16 to output an alarm sound or a message sound indicating that the other vehicle is approaching the own vehicle from a speaker provided in the driving cab of the own vehicle, or to turn on or blink an alarm lamp indicating that the other vehicle is approaching the own vehicle, or to display a message indicating that the other vehicle is approaching the own vehicle on a display provided in the driving cab of the own vehicle.

Thereafter, the object detection unit 24 detects whether or not the other vehicle has passed through the merging section based on an image captured by the camera 12 and a detection signal output from the ultrasonic sensor 13, the laser radar 14, or the millimeter wave radar 15 (step S6).

When the object detection unit 24 detects that the other vehicle has passed through the merging section (step S6: YES), the driving support processing unit 25 outputs a command signal to release the control of decelerating the own vehicle to the vehicle control unit 17, and releases the control of decelerating the own vehicle by the vehicle control unit 17 (step S7). When the command signal for stopping the own vehicle is output from the driving support processing unit 25 to the vehicle control unit 17 in step S5, a command signal for releasing the control for stopping the own vehicle has been output from the driving support processing unit 25 to the vehicle control unit 17 in step S7, and the control for stopping the own vehicle by the vehicle control unit 17 is released. When the driving support processing unit 25 has controlled the notification unit 16 to output an alarm or a message in step S5, the driving support processing unit 25 controls the notification unit 16 to stop the output of the alarm or the message in step S7. The driving support processing of steps S1 to S7 is repeatedly executed until the power source of the own vehicle is stopped.

Hereinafter, a specific flow of the driving support processing in each scene will be described with reference to three scenes.

(First Scene)

Figure 3A:
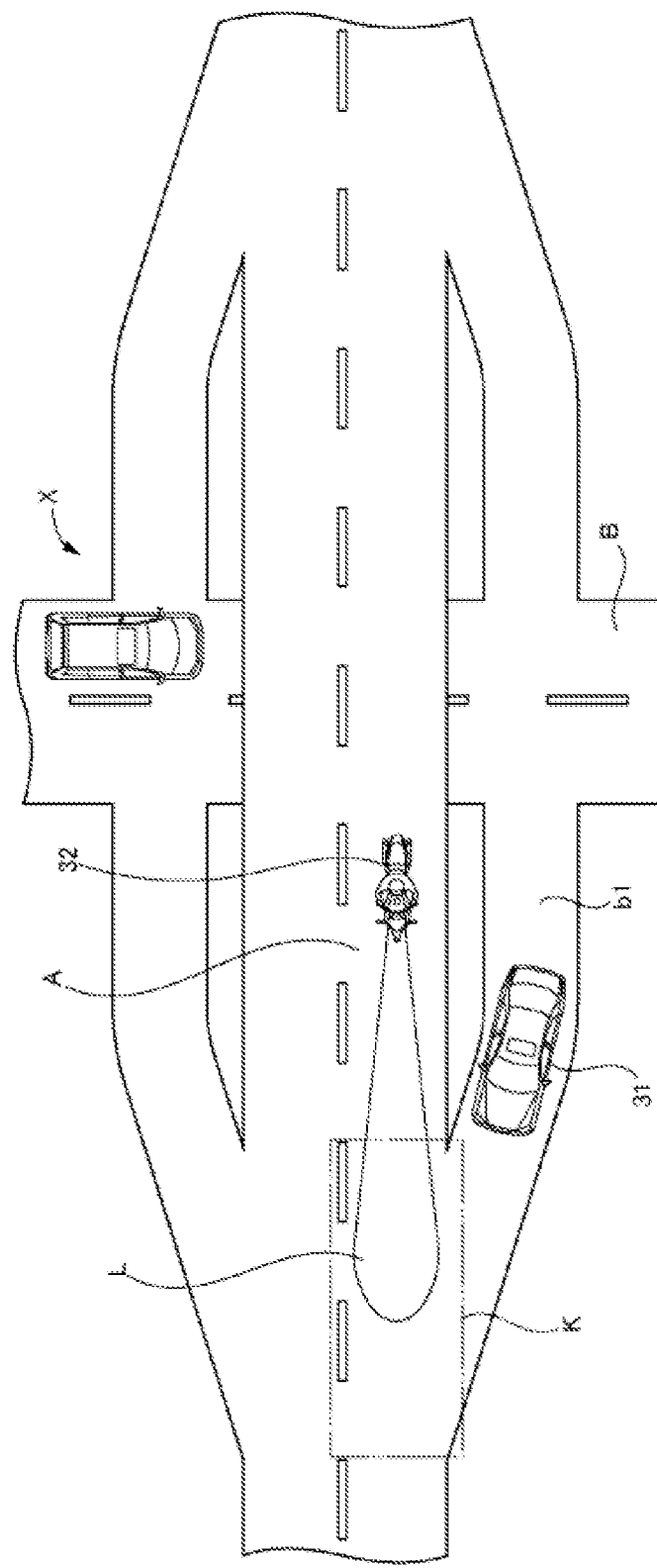
FIGS. 3A and 3B are explanatory diagrams showing a scene in which an own vehicle traveling on a connection path detects approach of the other vehicle traveling on an upper road in an overpass.
Figure 3B:
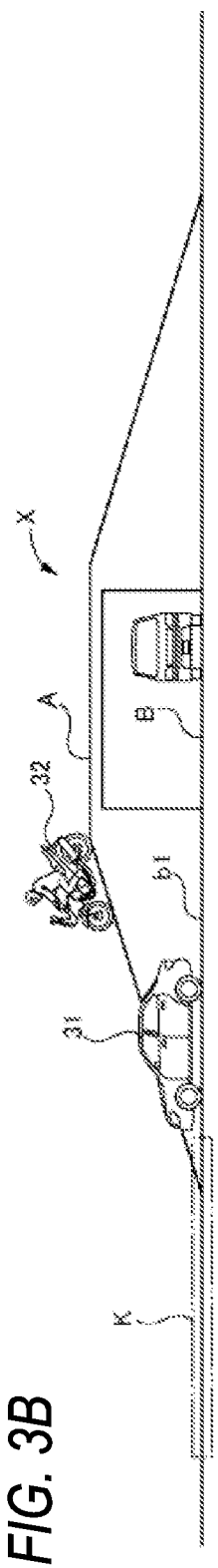

FIGS. 3A and 3B show a first scene. Specifically, FIG. 3A shows a state in which an overpass grade separation X in which a road A climbs over a road B is viewed from above. FIG. 3B shows a state in which the grade separation X in FIG. 3A is viewed from a lateral side (side view). At the grade separation X, there is a merging section K where a connection path b1 branching from the road B and the road A merge together after the road A climbs over the road B. The own vehicle 31 travels on the connection path b1 and approaches the merging section K. Further, the other vehicle 32 travels toward the merging section K at a section of the road A that has passed above the road B and started to descend at this time point. The other vehicle is, for example, a two-wheeled motor vehicle, and a headlight thereof is turned on not only at night but also in the daytime.

In such a scene, the position detection unit 21 of the driving support device 1 provided in the own vehicle 31 detects, based on the positioning signal received by the GPS receiver 11 and the map information 19 stored in the storage unit 18, that the own vehicle 31 is approaching the merging section K where the connection path b1 (first road) on which the own vehicle 31 is traveling and the road A (second road) having a height difference with respect to the connection path b1 merge with each other after there is no height difference between the connection path b1 and the road A. For example, the position detection unit 21 determines that the own vehicle 31 is approaching the merging section K when a distance between the current position of the own vehicle 31 and the merging section K is equal to or less than a predetermined approach reference distance. The approach reference distance may be a stop distance corresponding to a legal speed limit of a road on which the own vehicle 31 is traveling. The stop distance is a distance obtained by adding an idle running distance from when a driver of the vehicle finds a danger to when the driver depresses the brake and a braking distance from when the brake is depressed to when the vehicle actually stops. In general, when an idle running time is 1 second, a stop distance of a passenger vehicle on a dry paved road is 22 m when a vehicle speed is 40 km/h, and is 44 m when the vehicle speed is 60 km/h. The position detection unit 21 recognizes a legal speed limit of the connection path b1 based on the map information 19, and in a case where the legal speed limit of the connection path b1 is, for example, 40 km, determines that the own vehicle 31 is approaching the merging section K when a distance between the current position of the own vehicle 31 and the merging section K is equal to or less than 22 m.

Subsequently, the image recognition unit 22 identifies an image of a road surface of the merging section K from images captured by the camera 12. The own vehicle 31 is traveling toward the merging section K, the camera 12 is attached to a front end portion or the like of the own vehicle 31, and the camera 12 includes a wide-angle lens having an angle of view in the horizontal direction of, for example, about 180 degrees, so that the road surface of the merging section K is reflected on the camera 12 when the distance between the own vehicle 31 and the merging section K is equal to or less than 22 m. The image recognition unit 22 performs image recognition processing on the image captured by the camera 12, recognizes the road surface of the merging section K included in the image, and cuts out the image of the road surface of the merging section K from the image.

Subsequently, the luminance analysis unit 23 performs luminance analysis on the image of the road surface of the merging section K cut out by the image recognition unit 22. Here, when light emitted from a headlight of a vehicle reaches the road surface of the road, the road surface becomes partially bright even in the daytime. Therefore, in the image obtained by imaging the road surface of the road where the light emitted from the headlight of the vehicle reached, there are a part having high luminance since the light emitted from the headlight reached and a part having low luminance since the light emitted from the headlight did not reach. As shown in FIGS. 3A and 3B, when the own vehicle 31 is approaching the merging section K, the other vehicle 32 travels toward the merging section K at a section of the road A that extends linearly while inclining downward toward the merging section K with the headlight turned on. When the other vehicle 32 is in such a state, light L emitted from the headlight of the other vehicle 32 reaches the road surface of the merging section K. As a result, in the image of the road surface of the merging section K cut out by the image recognition unit 22, there are the part having high luminance since the light L emitted from the headlight of the other vehicle 32 reached and the part having low luminance since the light L emitted from the headlight of the other vehicle 32 did not reach, and a clear luminance difference is recognized between the part having high luminance and the part having low luminance. The luminance analysis unit 23 recognizes the luminance of each part in the image of the road surface of the merging section K, and recognizes that the road surface of the merging section K is irradiated with the light L emitted from the headlight of the other vehicle 32 traveling on the road A based on a difference in the luminance value of each part.

Subsequently, the driving support processing unit 25 outputs a command signal for decelerating the own vehicle 31 to the vehicle control unit 17 to decelerate the own vehicle 31 in order to avoid contact between the own vehicle 31 and the other vehicle 32. For example, the driving support processing unit 25 decelerates the own vehicle 31 such that the own vehicle 31 traveling on the connection path b1 reaches a speed at which the own vehicle 31 can safely stop in front of the merging section K (for example, a slow speed). The own vehicle 31 is forcibly decelerated under the control of the vehicle control unit 17. At this time, the driving support processing unit 25 may control the notification unit 16 to output a message and notify the driver of the own vehicle 31 that such forced control is being executed in the own vehicle 31.

Thereafter, when the object detection unit 24 detects that the other vehicle 32 has passed through the merging section K, the driving support processing unit 25 outputs a command signal to the vehicle control unit 17 to release the control for decelerating the own vehicle 31.

(Second Scene)

Next, FIGS. 4A and 4B show a second scene. Specifically, FIG. 4A shows a state in which an underpass grade separation Y in which a road C passes under a road D is viewed from above. FIG. 4B shows a state in which the grade separation Y in FIG. 4A is viewed from a lateral side (side view). At the grade separation Y, there is a merging section M where a connection path dl branching from the road D and the road C merge together after the road C passes under the road D. The own vehicle 31 travels on the connection path dl and approaches the merging section M. Further, the other vehicle 32 travels toward the merging section M at a section of the road C that has passed under the road D and started to rise at this time point. Further, a headlight of the other vehicle is turned on not only at night but also in the daytime.

In such a scene, the position detection unit 21 detects that the own vehicle 31 is approaching the merging section M where the connection path dl (first road) on which the own vehicle 31 is traveling and the road C (second road) having a height difference with respect to the connection path dl merge with each other after there is no height difference between the connection path dl and the road C. The details are the same as those in the case of the first scene.

Subsequently, the image recognition unit 22 identifies an image of a road surface of the merging section M from images captured by the camera 12, and cuts out the image of the road surface of the merging section M. The details are the same as those in the case of the first scene.

Subsequently, the luminance analysis unit 23 performs luminance analysis on the image of the road surface of the merging section M cut out by the image recognition unit 22. As shown in FIGS. 4A and 4B, when the own vehicle 31 is approaching the merging section M, the other vehicle 32 travels toward the merging section M at a section of the road C that extends linearly while inclining upward toward the merging section M with the headlight turned on. When the other vehicle 32 is in such a state, light L emitted from the headlight of the other vehicle 32 reaches the road surface of the merging section M. As a result, in the image of the road surface of the merging section M cut out by the image recognition unit 22, there are the part having high luminance since the light L emitted from the headlight of the other vehicle 32 reached and the part having low luminance since the light L emitted from the headlight of the other vehicle 32 did not reach. The luminance analysis unit 23 recognizes the luminance of each part in the image of the road surface of the merging section M, and recognizes that the road surface of the merging section M is irradiated with the light L emitted from the headlight of the other vehicle 32 traveling on the road C based on a difference in the luminance value of each part.

Subsequently, the driving support processing unit 25 outputs a command signal for decelerating the own vehicle 31 to the vehicle control unit 17 to decelerate the own vehicle 31 in order to avoid contact between the own vehicle 31 and the other vehicle 32. The details are the same as those in the case of the first scene. Thereafter, when the object detection unit 24 detects that the other vehicle 32 has passed through the merging section M, the driving support processing unit 25 outputs a command signal to the vehicle control unit 17 to release the control for decelerating the own vehicle 31.

(Third Scene)

Figure 5A:
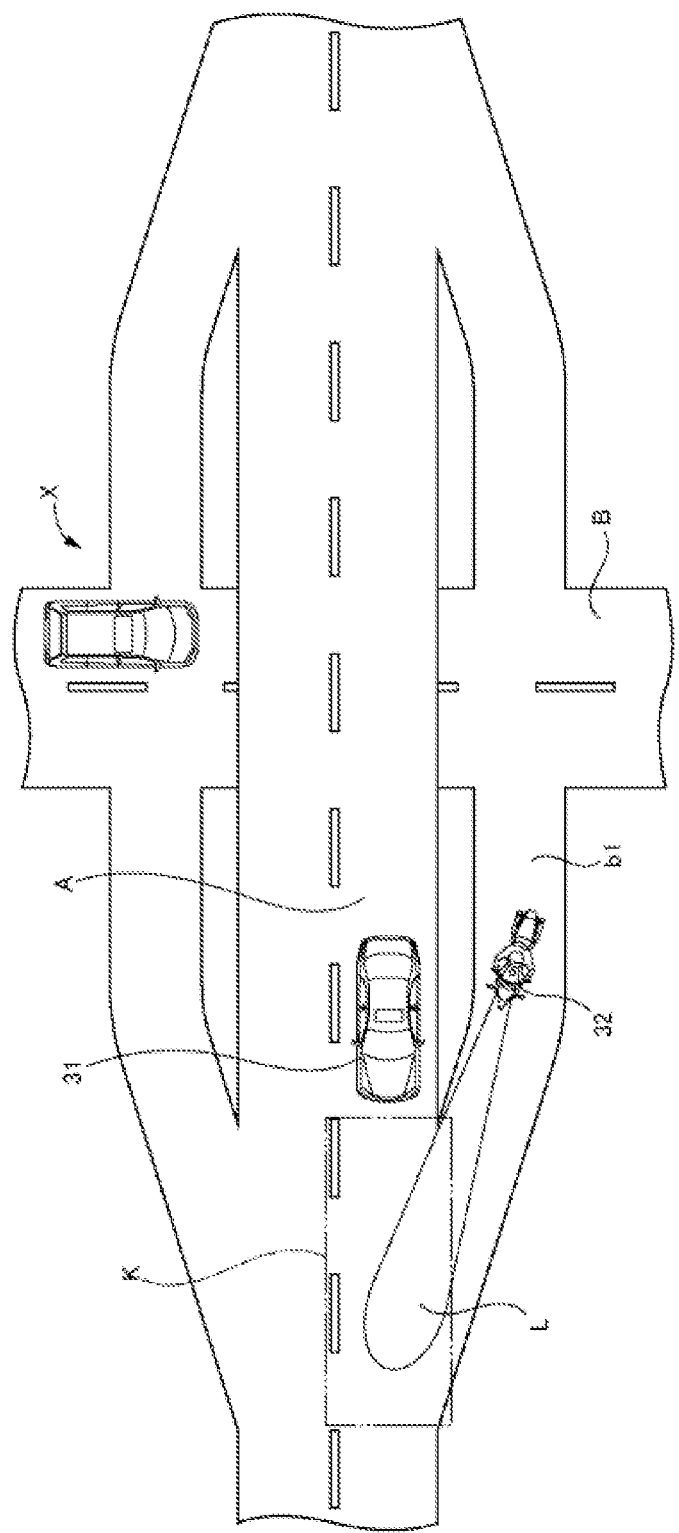
FIGS. 5A and 5B are explanatory diagrams showing a scene in which an own vehicle traveling on the upper road in the overpass detects approach of the other vehicle traveling on the connection path.
Figure 5B:
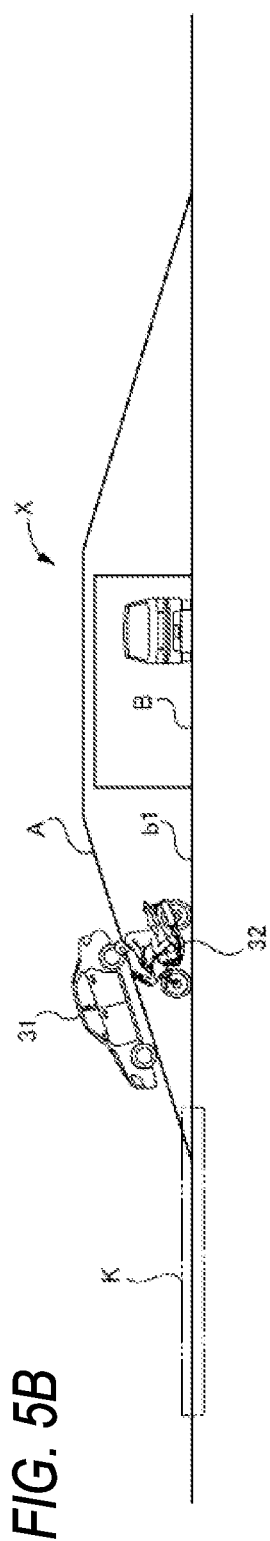

FIGS. 5A and 5B show a third scene. Specifically, FIG. 5A shows a state in which a grade separation the same as that of the first scene, that is, an overpass grade separation X in which a road A climbs over a road B is viewed from above. FIG. 5B shows a state in which the grade separation X in FIG. 5A is viewed from a lateral side (side view). As described above, at the grade separation X, there is the merging section K where the connection path b1 branching from the road B and the road A merge together after the road A climbs over the road B. In the third scene, unlike the first scene, the own vehicle 31 travels on the road A and approaches the merging section K. At this time point, the other vehicle 32 is traveling on the connection path b1 toward the merging section K. Further, a headlight of the other vehicle is turned on not only at night but also in the daytime.

In such a scene, the position detection unit 21 detects, based on the positioning signal received by the GPS receiver 11 and the map information 19 stored in the storage unit 18, whether or not the own vehicle 31 is approaching the merging section K where the road A (first road) on which the own vehicle 31 is traveling and the connection path b1 (second road) having a height difference with respect to the road A merge with each other after there is no height difference between the road A and the connection path b1.

For example, the position detection unit 21 recognizes a legal speed limit of the road A based on the map information 19, and in a case where the legal speed limit of the road A is, for example, 60 km, determines that the own vehicle 31 is approaching the merging section K when a distance between the current position of the own vehicle 31 and the merging section K is equal to or less than 44 m.

Subsequently, the image recognition unit 22 identifies an image of a road surface of the merging section K from images captured by the camera 12. As shown in FIGS. 5A and 5B, the own vehicle 31 is traveling toward the merging section K at a section of the road A that extends linearly while inclining downward toward the merging section K. In this state, when the distance between the own vehicle 31 and the merging section K is equal to or less than 44 m, the road surface of the merging section K is reflected on the camera 12. The image recognition unit 22 performs image recognition processing on the image captured by the camera 12, recognizes the road surface of the merging section K included in the image, and cuts out the image of the road surface of the merging section K from the image.

Subsequently, the luminance analysis unit 23 performs luminance analysis on the image of the road surface of the merging section K cut out by the image recognition unit 22. As shown in FIGS. 5A and 5B, when the own vehicle 31 is approaching the merging section K, the other vehicle 32 travels toward the merging section K on the substantially horizontal connection path b1 with the headlight turned on. When the other vehicle 32 is in such a state, light L emitted from the headlight of the other vehicle 32 reaches the road surface of the merging section K. As a result, in the image of the road surface of the merging section K cut out by the image recognition unit 22, there are a part having high luminance since the light L emitted from the headlight of the other vehicle 32 reached and a part having low luminance since the light emitted from the headlight of the other vehicle 32 did not reach. The luminance analysis unit 23 recognizes the luminance of each part in the image of the road surface of the merging section K, and recognizes that the road surface of the merging section K is irradiated with the light L emitted from the headlight of the other vehicle 32 traveling on the connection path b1 based on a difference in the luminance value of each part.

Subsequently, the driving support processing unit 25 outputs a command signal for decelerating the own vehicle 31 to the vehicle control unit 17 to decelerate the own vehicle 31 in order to avoid contact between the own vehicle 31 and the other vehicle 32. The details are the same as those in the case of the first scene. Thereafter, when the object detection unit 24 detects that the other vehicle 32 has passed through the merging section K, the driving support processing unit 25 outputs a command signal to the vehicle control unit 17 to release the control for decelerating the own vehicle 31.

As described above, in the driving support device 1 according to the embodiment of the present invention, it is possible to detect, based on the light emitted from the headlight of the other vehicle to the road surface of the merging section, the other vehicle approaching the merging section while descending from a place higher than the merging section, the other vehicle approaching the merging section while ascending from a place lower than the merging section, or the other vehicle traveling in the horizontal direction and approaching the merging section when the own vehicle travels toward the merging section while descending from a higher place. As a result, according to the driving support device 1 of the present embodiment, in a situation where there is a merging section where two roads having a height difference from each other merge after the height difference therebetween disappears, an own vehicle traveling on one road approaches the merging section, and the other vehicle traveling on the other road travels toward the merging section, it is possible to detect the approach of the other vehicle toward the merging section with high accuracy.

That is, since the ultrasonic sensor 13, the laser radar 14, or the millimeter wave radar 15 is a device that detects an object by transmitting an ultrasonic wave, a laser, or a millimeter wave having straight advancing ability in the horizontal direction, it is difficult to detect the other vehicle present in a place having a height difference with respect to a place where the own vehicle exists with high accuracy by the ultrasonic sensor 13, the laser radar 14, or the millimeter wave radar 15. However, according to the driving support device 1 of the present embodiment, the other vehicle is detected based on the light emitted from the headlight of the other vehicle to the road surface of the merging section, so that in the above-described situation, it is possible to detect the approach of the other vehicle toward the merging section with high accuracy as compared with the case where the approach of the other vehicle toward the merging section is detected using the ultrasonic sensor 13, the laser radar 14, or the millimeter wave radar 15.

In addition, on both sides of the upper road (road A in FIGS. 3A and 3B) in the overpass grade separation, a wall, a guardrail, a fence, and the like for preventing falling are generally provided. Therefore, when the other vehicle travels on such a road toward the merging section, the wall, the fence, and the like on both sides of the road may become obstacles and the other vehicle may not be reflected on the camera 12. In addition, when the own vehicle is traveling toward the merging section on the upper road in the overpass grade separation, similarly, a wall, a fence, and the like on both sides of the road may become obstacles, and the other vehicle may not be reflected on the camera 12. The lower road (road C in FIGS. 4A and 4B) in the underpass grade separation is submerged in the ground. Therefore, when the other vehicle is traveling on such a road toward the merging section, the ground or the like on both sides of the road may become an obstacle and the other vehicle may not be reflected on the camera 12. Therefore, in the above situation, it is not easy to detect the approach of the other vehicle toward the merging section with high accuracy by identifying an image of the other vehicle itself from images captured by the camera 12. However, according to the driving support device 1 of the present embodiment, the other vehicle is detected based on the light emitted from the headlight of the other vehicle to the road surface of the merging section, so that in the above-described situation, it is possible to detect the approach of the other vehicle toward the merging section with high accuracy as compared with the case where the approach of the other vehicle toward the merging section is detected by identifying the image of the other vehicle itself from the images captured by the camera 12.

In addition, the driving support device 1 according to the present embodiment detects that the road surface of the merging section is irradiated with the light emitted from the headlight of the other vehicle based on the luminance of each part in the image of the road surface of the merging section. Accordingly, it is possible to detect with high accuracy that the road surface of the merging section is irradiated with the light emitted from the headlight of the other vehicle.

In addition, the driving support device 1 according to the present embodiment performs, as a processing of avoiding contact between the own vehicle and the other vehicle, a processing of controlling the own vehicle to decelerate, a processing of controlling the own vehicle to stop, or a processing of outputting an alarm or a message to a driver (occupant) of the own vehicle. Accordingly, it is possible to avoid contact between the own vehicle and the other vehicle in a situation where there is a merging section where two roads having a height difference from each other merge after the height difference therebetween disappears, an own vehicle traveling on one road approaches the merging section, and the other vehicle traveling on the other road travels toward the merging section.

Further, based on the image captured by the camera 12 and the detection signal output from the ultrasonic sensor 13, the laser radar 14, or the millimeter wave radar 15, when it is detected that the other vehicle has passed through the merging section, the driving support device 1 according to the present embodiment performs the processing of releasing the deceleration control of the own vehicle when the processing of decelerating the own vehicle has been performed as the processing of avoiding the contact between the own vehicle and the other vehicle. The driving support device 1 performs the processing of releasing the stop control of the own vehicle when the processing of stopping the own vehicle has been performed as the processing of avoiding the contact between the own vehicle and the other vehicle. The driving support device 1 performs the processing of stopping the alarm or the like when the processing of outputting the alarm or the like to the driver of the own vehicle has been performed as the processing of avoiding the contact between the own vehicle and the other vehicle. Accordingly, the driver of the own vehicle can accelerate or start the own vehicle when there is no risk of contact between the own vehicle and the other vehicle and there is no other risk.

In the driving support processing of the above embodiment, as shown in FIG. 2, the luminance analysis is performed on the image of the road surface of the merging section cut out from the image captured by the camera 12 when the own vehicle approaches the merging section, and it is detected whether or not the road surface of the merging section is irradiated with the light emitted from the headlight of the other vehicle. This driving support processing may be modified as shown in FIG. 6.

Figure 6:
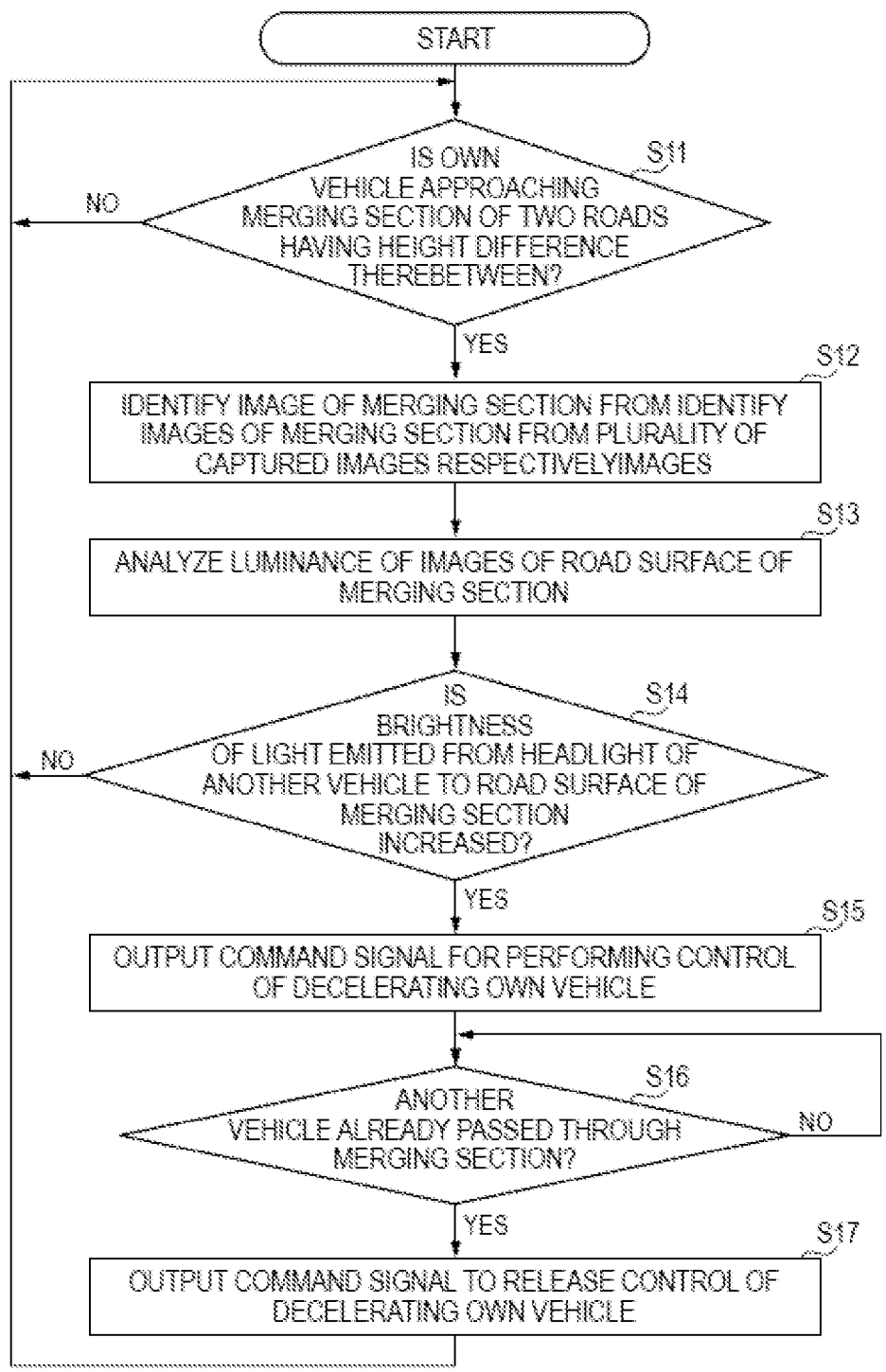
FIG. 6 is a flowchart showing a modification of the driving support processing in the driving support device according to the embodiment of the present invention.

In the modification of the driving support processing shown in FIG. 6, similarly to the process of step S1 in the driving support processing shown in FIG. 2, the position detection unit 21 detects whether or not the own vehicle is approaching a merging section where a first road on which the own vehicle is traveling and a second road having a height difference with respect to the first road merge with each other after there is no height difference between the first road and the second road (step S11). Then, when the position detection unit 21 detects that the own vehicle is approaching the merging section (step S11: YES), the image recognition unit 22 performs image recognition processing on each of a plurality of (for example, several tens of) images continuously captured by the camera 12 until a predetermined time (for example, about 1 second to 3 seconds) elapses from this time point or on each of a plurality of frame images of a moving image captured by the camera 12, and identifies and cuts out an image of a road surface of the merging section from each image (step S12). As a result, a plurality of images of the road surface of the merging section are obtained during a period from the time point at which the own vehicle approaches the merging section to the time point at which the predetermined time elapses. Subsequently, the luminance analysis unit 23 performs luminance analysis on the plurality of images of the road surface of the merging section (step S13). Then, the luminance analysis unit 23 detects whether or not brightness of the light emitted from the headlight of the other vehicle to the road surface of the merging section is increased based on the luminance of each part in each of the plurality of images of the road surface of the merging section (step S14). When the luminance analysis unit 23 detects that the brightness of the light emitted from the headlight of the other vehicle to the road surface of the merging section is increased (step S14: YES), the driving support processing unit 25 performs a processing of avoiding the contact between the own vehicle and the other vehicle as in the process of step S5 in the driving support processing shown in FIG. 2 (step S15). Thereafter, the object detection unit 24 detects whether or not the other vehicle has passed through the merging section similarly to the process of step S6 in the driving support processing shown in FIG. 2, and when the object detection unit 24 detects that the other vehicle has passed through the merging section (step S16: YES), the driving support processing unit 25 outputs a command signal to release the control of decelerating the own vehicle to the vehicle control unit 17 to release the control of decelerating the own vehicle (step S17).

According to the modification of the driving support processing shown in FIG. 6, it is detected whether or not the brightness of the light emitted from the headlight of the other vehicle to the road surface of the merging section is increased, so that it is possible to distinguish between a case where the other vehicle approaches the merging section while turning on the headlight and a case where the merging section is only irradiated with light from road illumination, for example. Accordingly, in a situation where there is a merging section where two roads having a height difference from each other merge after the height difference therebetween disappears, an own vehicle traveling on one road approaches the merging section, and the other vehicle traveling on the other road travels toward the merging section, it is possible to improve the accuracy with which the approach of the other vehicle toward the merging section is detected.

In the above embodiment, a case where whether or not the own vehicle is approaching the merging section is detected based on the positioning signal received by the GPS receiver 11 and the map information 19 is described as an example, and the camera 12, the laser radar 14, or the millimeter wave radar 15 may also be used to perform this detection.

Further, in the above embodiment, a case where it is detected that the road surface of the merging section is irradiated with the light emitted from the headlight of the other vehicle is described as an example, and whether or not the road surface of the merging section is irradiated with light emitted from another lighting device which is provided in the other vehicle and can irradiate the front of the other vehicle, such as a fog lamp, a position lamp, or a daylight provided in the other vehicle may be detected.

Further, in the above embodiment, as a merging section where a first road on which the own vehicle is traveling and a second road having a height difference with respect to the first road merge with each other after there is no height difference between the first road and the second road, the merging section of the one road of the grade separation and the connection path for moving to the one road from the other road of the grade separation is described as an example, and the merging section where the first road on which the own vehicle is traveling and the second road having a height difference with respect to the first road merge with each other after there is no height difference between the first road and the second road is not limited thereto. For example, an intersection at which one road intersects with another road after descending from a high place or an intersection at which one road intersects with another road after ascending from a low place also corresponds to the merging section where the first road on which the own vehicle is traveling and the second road having a height difference with respect to the first road merge with each other after there is no height difference between the first road and the second road In addition, in the above embodiment, the own vehicle is a vehicle in which a driver (person) mainly performs driving, and the present invention is not limited thereto. The own vehicle may be a semi-autonomous vehicle in which a person gets into the vehicle and does not mainly drive the vehicle, but may monitor the movement of the vehicle and may drive the vehicle as necessary, or may be a completely autonomous vehicle in which a person does not drive the vehicle.

A vehicle type of the own vehicle and the other vehicle are not limited. Either of the own vehicle and the other vehicle may be any one of a four-wheeled motor vehicle, a three-wheeled motor vehicle, and a two-wheeled motor vehicle, or may be a vehicle having more wheels. Either of the own vehicle and the other vehicle may be any one of a passenger vehicle, a truck, a trailer, a bus, and a straddle-type vehicle, or may be a special vehicle.

The present invention can be modified as appropriate without departing from the scope or spirit of the invention which can be read from the claims and the entire specification, and the driving support device accompanying such a change is also included in the technical concept of the present invention.

What is claimed is:

1. A driving support device that supports driving of a vehicle, the driving support device comprising:
    an imaging device configured to capture an image of at least a front of the vehicle; and
    a control device configured:
        to detect whether or not the vehicle is approaching a merging section where a first road on which the vehicle is traveling and a second road having a height difference with respect to the first road merge with each other after there is no height difference between the first road and the second road;
        to identify an image of a road surface of the merging section from the image captured by the imaging device when it is detected that the vehicle is approaching the merging section;
        to detect whether or not the road surface of the merging section is irradiated with light emitted from a lighting device of another vehicle traveling on the second road based on luminance of each part in the image of the road surface of the merging section identified; and
        to perform a processing of avoiding contact between the vehicle and the other vehicle when it is detected that the road surface of the merging section is irradiated with the light emitted from the lighting device of the other vehicle.

2. The driving support device according to claim 1, wherein the control device is configured to detect whether or not brightness of the light emitted from the lighting device of the other vehicle to the road surface of the merging section is increased based on the luminance of each part in each of a plurality of images of the road surface of the merging section continuously captured by the imaging device, and
wherein the control device is configured to perform a processing of avoiding contact between the vehicle and the other vehicle when the control device detects that the brightness of the light emitted from the lighting device of the other vehicle to the road surface of the merging section is increased.

3. The driving support device according to claim 1, wherein the second road is an upper road in an overpass or a lower road in an underpass.

4. The driving support device according to claim 1, wherein the first road is an upper road in an overpass.

5. The driving support device according to claim 1, wherein the control device is configured to perform, as a processing of avoiding contact between the vehicle and the other vehicle, a processing of outputting an alarm or a message to an occupant of the vehicle, a processing of controlling the vehicle to decelerate, or a processing of controlling the vehicle to stop.

6. The driving support device according to claim 5 further comprising:
    an object detector configured to detect an object present at least in front of the vehicle by using an ultrasonic wave, light, or a radio wave; and
    the control device configured to detect whether or not the other vehicle has passed through the merging section based on an image captured by the imaging device and a detection signal output from the object detector,
    wherein the control device is configured to perform, in a case where a processing of outputting an alarm or a message to the other vehicle is performed as a processing of avoiding contact between the vehicle and the other vehicle, a processing of stopping the alarm or the message when the control device detects that the other vehicle has passed through the merging section, in a case where a processing of performing deceleration control on the vehicle is performed as a processing of avoiding contact between the vehicle and the other vehicle, a processing of releasing the deceleration control on the vehicle when the control device detects that the other vehicle has passed through the merging section, and in a case where a processing of performing stop control on the vehicle is performed as a processing of avoiding contact between the vehicle and the other vehicle, a processing of releasing the stop control on the vehicle when the control device detects that the other vehicle has passed through the merging section.

7. The driving support device according to claim 1, wherein the vehicle is an autonomous vehicle.

* * * * *